Oct. 26, 1965  D. L. COOPER ETAL  3,213,805
PUMP CONTROL MEANS
Filed Feb. 25, 1963  2 Sheets-Sheet 1
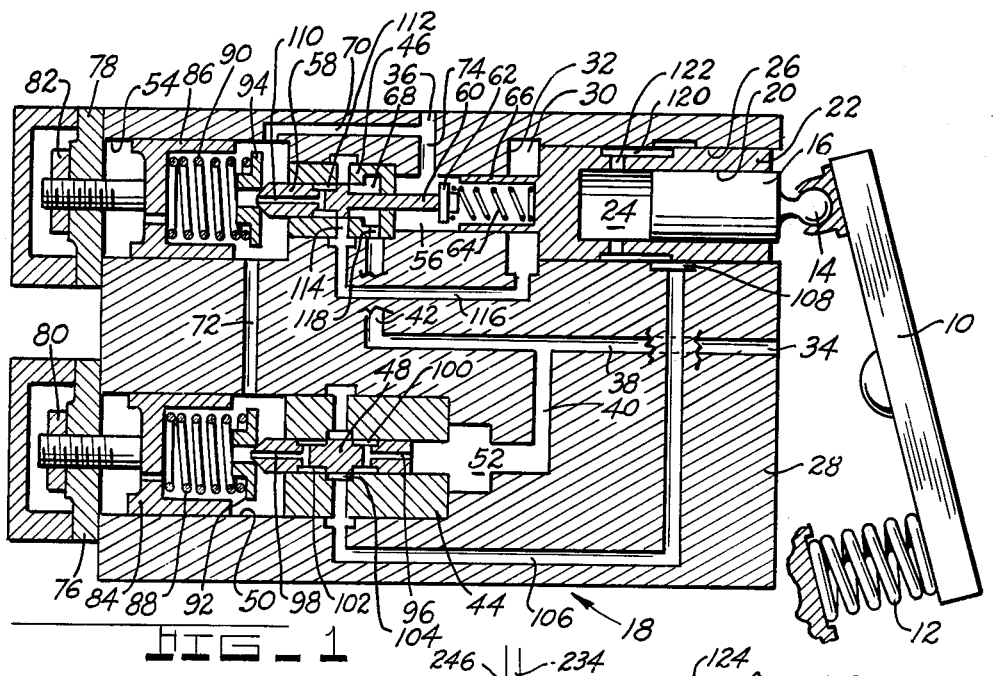
FIG_1
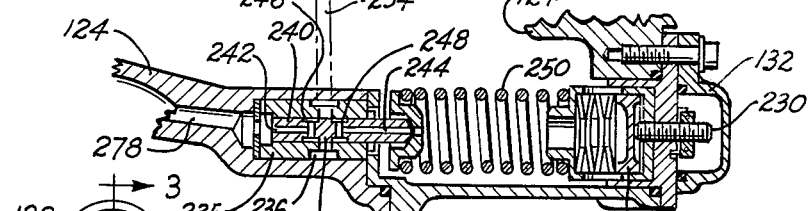
FIG_4
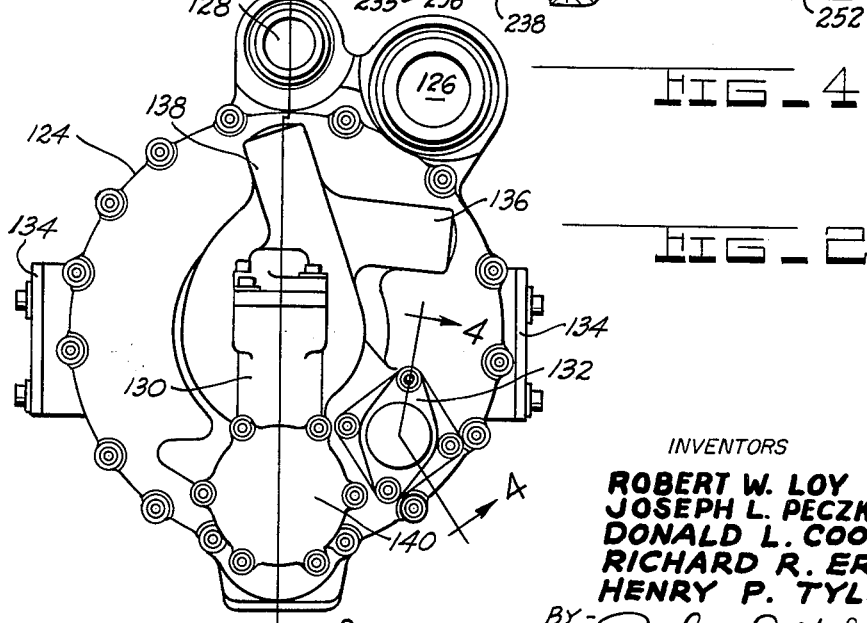
FIG_2
INVENTORS
ROBERT W. LOY
JOSEPH L. PECZKOWSKI
DONALD L. COOPER
RICHARD R. ERICK
HENRY P. TYLER
BY Richard G. Geib
ATTORNEY

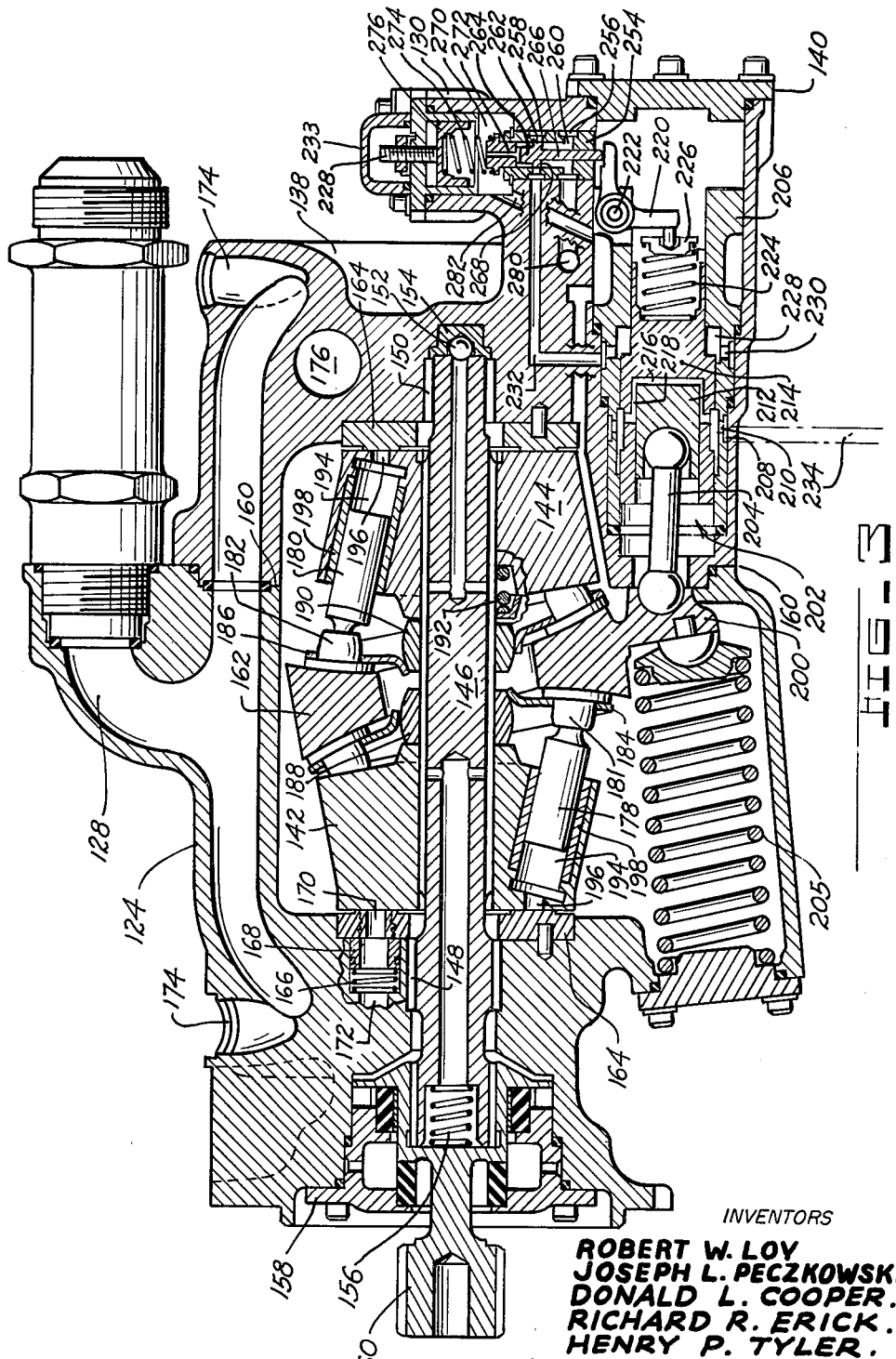

> United States Patent Office 3,213,805
Patented Oct. 26, 1965

3,213,805
PUMP CONTROL MEANS
Donald L. Cooper, Richard R. Erick, Henry P. Tyler, Robert W. Loy, and Joseph L. Peczkowski, South Bend, Ind.; said Cooper, Erick, and Tyler assignors to The Bendix Corporation, South Bend, Ind., a corporation of Delaware
Filed Feb. 25, 1963, Ser. No. 260,637
8 Claims. (Cl. 103—162)

This invention relates to a means for positioning a member such as a variable discharge pump control means such that the rate of response and the accuracy of response is far better than heretofore possible for such devices.

In the past most pumps and/or fluid motors have been controlled by integral controllers in order to achieve the desired rate of response. Studies recently conducted have shown that such controllers have a basic stability problem at zero and low output flows scheduled for the pump or motor. It has been found that the stability can be improved with bleeds between the control pressure and the inlet pressure. This, however, has created problems of pressure error or pressure droop and reduced efficiency due to leakage. The present invention is, therefore, primarily concerned with providing a control system which can be adapted to the optimum lead-lag response to outlet pressure to system demand.

It is a further object of our invention to provide a control system for a pump or fluid motor having a proportional-plus-integral means responsive to an input signal to provide a rapid dynamic response and a zero steady state error.

A still further object of this invention is to provide a proportional-plus-integral control means having means to vary the control means in accordance with flow rate and pressure requirements.

As may be realized by those skilled in the art to which our invention relates, other and further objects and advantages may be found in the following description of the accompanying drawings in which:

FIGURE 1 is a schematic of a control system for a pump swash or wobble plate in accordance with the teachings of our invention;

FIGURE 2 is an end view of a pump housing showing a typical control valving arrangement in accordance with our invention;

FIGURE 3 is a sectional side view of a pump taken along line 3—3 of FIGURE 2 and showing the proportional valve arrangement in accordance with our invention; and FIGURE 4 is a broken sectional view of the pump housing taken along lines 4—4 of FIGURE 2 and showing the integrating valve arrangement according to the principles of our invention.

Now with particular reference to the schematic of FIGURE 1, a pump swash plate or wobble plate 10, as it may be termed, having a spring 12 urging it to a maximum delivery position is shown connected, as by the ball joint 14, to an integrating piston 16 of a proportional-plus-integral controller 18. As seen, the integrating piston is slidably mounted in a bore 20 of a proportional piston 22 such that a variable volume chamber 24 is formed to the rear of the piston 16 between it and the rear wall of bore 20. In addition, piston 22 is slidably mounted in a cylinder cavity 26 of a housing 28 to form a variable volume chamber 30 between the rear of the proportional piston 22 and the rear end wall 32 of the cylinder 26.

With this arrangement the integral piston 16 can be made to act independently of the proportional piston 22 and similarly the proportional piston, due to lack of change of the volume of chamber 24, if the integral piston is not acting, would be able to act independent of the integral piston. Therefore, the combined action of these pistons, when acting at the same time on swash plate or similar variable control means would impose a proportional-plus-integral action to the control means.

With regard to the complete control system presented by FIGURE 1, and as used with a pump means, the controller 18 is supplied with a pump outlet pressure at port 34 and a pump inlet pressure at port 36. The port 34 is communicated by an internal passage 38 to branch passages 40 and 42 leading to an integral valve housing or sleeve 44 and a proportional valve housing or sleeve 46.

The integral valve housing is axially bored and open at both ends to receive a valve spool or body 48. The housing 44 is placed within a cavity 50 of the main housing, which cavity 50 is stepped so that a chamber 52 is formed at one end of the cavity between it and the valve sleeve 44. This chamber 52 is communicated with branch passage 40 to in turn communicate discharge pressure from port 34 to the valve spool 48.

The proportional valve housing 46 is similarly placed in a cavity 54 which leads to a tubular portion 56 terminating in chamber 30 aforementioned. The housing 46 is of a closed end variety having a valve spool 58 reciprocally mounted therein. The spool 58 is provided with a stem 60 which slidably projects from the closed end of the housing 46 into the tubular portion 56. The stem 60 is provided with a head 62 forming a spring retainer for spring 64, which spring is compressed between piston 22 and head 62 within a tubular projection 66 of the piston 22. Normally, when the valve spool 58 and the piston 22 are in the non-energized position shown by FIGURE 1 the spring 64 is in a slightly compressed condition. About the stem 60 within the closed end of the valve housing 46 a valve face is formed to in turn create a variable volume chamber 68 in the closed end of the valve housing.

The cavities 50 and 54 are ported to the inlet port 36 by passages 70 and 72, and the portion 56 between the valve housing 46 and chamber 30 is also vented to inlet pressure, as by the passage 74. The cavities are sealed by plates 76 and 78, which plates form bearing surfaces for adjusting means 80 and 82, respectively. The adjusting means position slide members 84 and 86 in cavities 50 and 54 respectively. The slide members in turn form spring retainers for a pair of springs 88 and 90 that act through bearing members 92 and 94, respectively, on valve spools 48 and 58, respectively. This changes the reference load on spools 48 and 58 in the sleeves 44 and 46. As for spool 58, however, spring 64 tends to limit the effect of spring 90.

As for the construction of the spools 48 and 58, they may be made as follows: The spool 48 is formed with axial passages 96 and 98 terminating in radial passages leading to a pair of spaced peripheral grooves 100 and 102 in the valve spool. These grooves are designed to be in the position shown when the valve is at rest (i.e., not scheduling control flow) where they straddle the port 104 in the valve housing or sleeve 44, which port 104 communicates with a passage 106 in housing 28 leading to a port 108 in the side of the cylinder cavity 26. The spool 58 is provided with but one axial passage 110 having radial branches leading to a peripheral groove 112 in spool 58. The other end of the spool 58 is formed as a flat surface to prescribe the variable volume chamber 68 aforementioned. As seen, the face or flat surface of spool 58 and the groove 112 straddle a port 114 in sleeve 46 leading to a passage 116 communicating port 114 with chamber 30. In addition, the valve sleeve is ported, as at 118, to passage 42 to communicate port 34 and chamber 68. As shown, the grooves 100, 102, 112 and the flat surface of spool 58 are arranged to have line to line contact with their respective ports in the respective valve sleeves. If other action is required such line to line relationship would be varied accordingly, as would readily be understood by those skilled in the art.

The proportional piston 22 is also grooved, as at 120, and provided with a plurality of radial passages 122 to communicate port 108 to chamber 24. Thus, control flow from passage 106 may enter chamber 24 to operate the integral piston 16.

In operation, discharge pressure from a pump controlled by swash plate 10 is transmitted to port 34. This pressure is then transmitted by passages 38, 40 and 42 to the chambers 52 and 68. This pressure then biases valve spools 48 and 58 to oppose springs 88 and 90, respectively.

As the discharge pressure level raises to overcome the springs control pressure is introduced into passages 106 and 116. This increased the pressure in chambers 24 and 30, respectively, to force pistons 16 and 22 to move outwardly of bore 20 and cylinder 26 respectively.

As piston 22 moves it lessens the load on spring 64 which allows spring 90 to reposition the spool 58 to terminate control pressure flow between chamber 68 and port 114. The net effect of springs 64 and 90 on valve spool 58 increases the loading on the spool requiring a higher discharge pressure in chamber 68 to open the valve and continue the travel of piston 22 to position the swash plate 10 in a zero flow attitude.

However, no feedback is present between valve 48 and piston 16. Thus the amount of travel of piston 16 is primarily dependent on the time the spool 48 is communicated to chamber 52 and port 104, and as position of piston 16 is a function of time, piston 16 is thus an integrating piston.

While the pistons have been more-or-less described collectively, it is to be understood that they have the ability to stroke the swash plate or cam 10 independently of each other. As may be readily surmized by those skilled in the art, when valve spool 58 does not schedule flow to chamber 30, the piston 16 can still move the cam 10. This is assuming, of course, that the respective valve is scheduling movement of the respective piston when the other is not. However, as the system is shown, the spools 48 and 58 will never move independent of the other unless failure on one of the systems has occurred. Therefore, their combined action will result in a proportional-integral motion of the cam.

When, on the other hand, the discharge pressure is lowered, the actions of pistons 16 and 22 are reversed, i.e., the spools 48 and 58 move to the right, as seen in the drawings, to port the inlet pressure to chambers 24 and 30. As this happens to spool 58 the spring load of spring 64 is increased to decrease the net effect of springs 64 and 90.

With regard to the pump details presented by FIGURES 2, 3 and 4, we show a pump housing 124 having a fluid inlet 126 and a fluid outlet 128. To this housing we have incorporated a proportional valve housing 130 and an integral valve cavity cover 132. As may also be seen in FIGURE 2 we have incorporated side trunnion bearing access covers 134 and on each end of the housing we have cast port connecting means 136 and 138 to unite the inlet and outlet, respectively, of each pump unit. In addition, we have shown a cover plate 140 for ease in assembling and disassembling the actuator piston assembly hereinafter described.

With reference now to FIGURE 3, we show within the housing 124 a pair of rotors 142 and 144 affixed to a common shaft 146, which shaft is revolvably supported in bearings 148 and 150. The shaft is longitudinally positioned between a thrust bearing having a ball 152 and block 154 and a spring 156, which spring is operatively connected to a seal retainer 158 through a stub shaft 160 splined with shaft 146 and axially movable relative thereto.

The housing 124 is preferably made of two parts and joined along the line 160 formed by the abutting faces of each part. As seen, the necessary seals are incorporated in such a joint to insure against leakage and dust or foreign particle penetration.

Between the rotors a swash plate, wobble plate or cam 162 is pivotally mounted by trunnions (not shown) which extend laterally into the areas enclosed by plates 134 (see FIGURE 2) so that cam 162 may pivot about a lateral axis.

At each end of the rotors a pair of port plates 164 are provided, which port plates are urged into sealing contact with rear rotor faces by a spring 166 and a ferrule 168 interposed with the spring 166 and port plate 164. This sealing means is repeated in a plurality of positions around the port plate and particularly adjacent exhaust ports 170 for the rotors, as shown. The exhaust port 170, as shown, is communicated through the spring assembly to a passage 172 which opens into a passage 174 in the outlet port connecting means 138. Similarly, the inlet port (not shown) communicates with the inlet connecting means and more particularly a chamber 176 thereof. These port plates are of a variety known to those skilled in the art having kidney shaped ports with the discharge port.

In the unit sectioned and shown by FIGURE 3 each of the rotors 142 and 144 have nine equally spaced pistons 178 and 180, which are commonly reciprocated by the non-rotating cam plate 162 through individual plunger shoes 181 and 182. Auxiliary cam plates 184 and 186 mounted on thrust bearings 188 and 190 and positioned by springs (one of which is shown, as at 192) hold the plunger shoes 181 and 182 against the cam plate at all times, assisting return of the pistons or plunger 178 and 180 during a suction stroke.

The rotors are further constructed to have nine chambers 194 (each) for the nine plungers which chambers have ports 196 opposite the end receiving the plungers. In order to increase pump life, wear resistant sleeves 198 in each of the chambers have been provided.

The rotors 142 and 144 are splined to be affixed to the shaft 146. A typical installation of rotor to shaft has been made when the shaft has 17 spline teeth and the rotor 18, so that when starting with a vertical spline of the shaft, the third spline away will make a 45° angle with respect to the vertical spline axis. This allows for varying the placement of the rotors 142 and 144 on the shaft 146 so that the discharge from one rotor is not in phase with the other or any other arrangement which is desirable.

As an example, and using the above shaft and rotor relationship, one rotor is mounted to the shaft such that the vertical spline axis mentioned intersects the longitudinal axis of one of the cylinders. This means that the next cylinder of the nine cylinder rotor is 40° from the aforementioned intersection of axes. The other rotor is placed on the shaft such that the vertical spline axis passes midway between two cylinders. Thus, the cylinders of one rotor are 20° out of phase with the cylinders of the rotor. However, the important feature here is the adaptability of our pump to various relationships between the rotors. With the relationship above, the pulses of the discharge flow are cancelled to provide a flow substantially free of pulsations.

As with the schematic presentation of FIGURE 1, the angle of cam plate 162 controls the displacement capacity of the pump. The cam plate is provided with a boss 200 forming a stop with the pump housing, as shown, to limit the maximum cam plate angle and thus the maximum capacity or displacement of the pump.

Variable delivery at a constant pressure is provided by control of the cam plate angle by a nested piston actuator 202 connected to the cam plate by a link 204. As seen, we employ a spring 205 to act in opposition to the actuator 202, and this spring provides rapid response to sudden demands for increased delivery rate.

The actuator 202 is mounted in a cavity in the pump housing 124 closed by the cover 140. The actuator includes a cylinder 206 having a radial groove 208 and passage 210 leading to the cylinder interior from the groove, and a pair of nested pistons 212 and 214, the former of which is integrally connected to link 204 and separated from the piston 214 by an interposed chamber 216. The chamber 216 is communicated to the passage 210 by a plurality of annular spaced portions 218 between piston 212 and cylinder 206. The piston 214 is resiliently linked to a bellcrank 220 pivoted to the pump housing 124 at 222 by a spring 224 and spring bearing plate 226. Behind piston 214 is a chamber 228 having a radial port 230 aligned with a passage 232 within the housing 124; whereas, the groove 208 in cylinder 206 communicates with a passage 234 (shown in phantom in FIGURES 3 and 4) in the pump housing. In that the actuator is comprised of two independent pistons 212 and 214, two control systems can be provided to induce the proper dynamic response throughout the required frequency range of pump operation. In addition, this characteristic is further aided by incorporating two pressure adjustments 228 and 230 (see FIGURES 3 and 4) which adjustments are accessible from the rear of the pump housing through the cover plate 233 and 132, respectively. Before passing to the actual valve construction, we should add that, as in the schematic, the unusual physical arrangement of the actuator pistons provides a summing action without unwieldy structural linkages.

The inner piston 212 is controlled in virtually an integral action. Its control valve consists of a valve housing 235 (see FIGURE 4) having a plurality of side ports 236 leading to the interior thereof. These side ports are normally blocked by a valve spool land 238 of a valve spool 240. The spool 240 is provided at each end with axial passages 242 and 244 leading to inwardly spaced peripheral grooves 246 and 248, respectively, adjacent the land 238. The spool is biased to the left, as viewed in FIGURE 4, by a spring 250, which spring is varyingly loaded by a slide member 252 and the adjustment 230 aforementioned.

The outer piston 214 (see FIGURE 3) is controlled in virtually a proportional action. Its control valve consists of a valve housing 254 having radial ports 256 and 258 with port 256 open to a chamber 260 and port 258 normally closed by a land 262 of a valve spool 264. The spool 264 is linked to bellcrank 220 by a pin 266 and is provided with a pressure responsive surface 268 forming one end of the land 262. The spool is grooved about the periphery adjacent the other end of the land 262, which groove is communicated to the end of spool 264 projecting into a low pressure cavity 270 by an axial passage 272. The spool 264 is held against the projection 266 by a spring 274 adjustably loaded by a slide member 276 and the adjustment 228.

As for the valve housing 235, pump discharge pressure is communicated to the left end of spool 240 by a passage 278 connected to the passage 174 of the outlet connection; whereas, the discharge pressure is fed from a passage 280 connected to passage 174 to the chamber 260 via port 256 and thus the lower end of spool 264, as viewed in the respective FIGURES 3 and 4.

Inlet pressure on the other hand, is communicated to the right end of spool 240 via a passage in the housing (not shown) similar to passage 282 leading the inlet pressure to the upper end of chamber 270 for spool 264.

In operation, discharge pressure overcomes springs 250 and/or 274 or aids these springs to move lands 238 or 262, respectively, to port control fluid to passages 234 or 232, respectively, to project or retract pistons 212 or 214, respectively, with respect to cylinder 206. As spool 264 is resiliently linked to piston 214 the positions of the spool are proportional with that of the valve; whereas, there being no such link between spool 240 and piston 212 the position of piston 212 is a function of the time land 238 ports control fluid. Thus, the combined action of the pistons and respective valves is proportional in any transient between minimum and maximum output, but integral at equilibrium. The degree of proportionality increases with the frequency of excitation, as determined by selected design parameter values. Therefore, low and high frequency response requirements can be made compatible.

As other forms of our device will be readily apparent to those skilled in the art, we do not propose to be limited by the above description. Instead the above description is merely considered to present preferred forms of making our control system as used with a fluid device of the order described. Therefore, we intend that the true scope of our invention is set forth in the appended claims.

We claim:

1. In a pump having a fluid outlet and a variable discharge control means:
   a first valve means connected to said outlet;
   a first piston means operatively connected with said control means, said first piston means being controlled by said first valve means;
   a sensing means operatively connected with said first valve means and said first piston means to control valve movement in response to piston movement;
   a second valve means connected to said first fluid outlet;
   a second piston means controlled by said second valve means in accordance with pump discharge pressure, that opens said second valve means to control said second piston means; and
   means to additively connect said first and second pistons to said variable discharge control means.

2. In a pump in accordance with claim 1 wherein said means for additively connecting said first and second piston means includes a bore in which said first and second piston means are mounted coextensively with a variable volume chamber between said first and said second pistons with said second piston being connected to said variable discharge means of said pump.

3. In a pump according to claim 1 and further comprising:
   a first means to adjustably reference said first valve means to a known pressure; and
   a second means to adjustably reference said second valve means to a known pressure.

4. In a pump according to claim 1 and further characterized in that said first and second valve means both are provided with internal passages normally communicating to a fluid of lower pressure than said pressurized fluid which internal passages are communicated with grooves in said first and second valve means, which grooves are arranged to alternatively communicate the fluid of lower pressure and the pressurized fluid to variably control said first piston means and said second piston means.

5. In a pump having a fluid inlet and a fluid outlet for a rotor having reciprocating pistons therein whose travel is regulated by a variable discharge control means:
   a first valve means having a first valve member with one face thereof subjected to fluid from said fluid inlet and an opposite face thereof subjected to fluid from said fluid outlet with means for alternatively communicating said fluid inlet and said fluid outlet to a control passage;
   a first piston means in fluid communication with said control passage from said first valve means, said first piston means controlled by said first valve means;
   a sensing means operatively connected with said first valve means and said first piston means to control valve movement in response to piston movement;
   a second valve means having a second valve member with one face thereof subjected to pressure from said fluid inlet and the opposite face thereof subjected to pressure from said fluid outlet with means therein for alternatively communicating said fluid inlet and said fluid outlet to a second control passage;

a second piston means in fluid communication with said second control passage to be controlled by said second valve means in accordance with pump discharge pressure, of a predetermined value which, when reached, will open said second valve means to control said second piston means; and means to additively connect said first piston means and said second piston means to said variable discharge control means such that said first piston means and said second piston means may together and individually position said variable discharge control means.

6. In a pump according to claim 5 wherein said first valve means and said second valve means are further characterized by including:

a first adjustable mechanism and a second adjustable mechanism for said first valve means and said second valve means, respectively, to provide a variable reference source for valve operation in alternately connecting the fluid inlet and the fluid outlet to the respective control passages, said first adjustable mechanism and said second adjustable mechanism operatively connecting said first valve means and said second valve means, respectively, to bias said first valve member and said second valve member against the pressure on the opposite ends thereof from said fluid outlet.

7. In a variable discharge pump including a fluid inlet, a fluid outlet, a rotor, a plurality of pistons reciprocally mounted in said rotor and a wobble plate normally biased to permit maximum travel of said pistons, an actuator to vary the attitude of said wobble plate, said actuator comprising:

a first valve means including a valve sleeve, a valve spool having an axial passage for communicating a fluid inlet pressure directed to one end of said spool to a groove around said valve spool, a pressure responsive face at the end of said valve spool opposite that in contact with said fluid inlet pressure, a pressure port in said valve sleeve communicating the fluid outlet port to said pressure responsive face and a radial port intermediate the valve spool in said valve sleeve communicated to a control passage;

means biasing said first valve spool to open the axial passage in said second valve spool to the radial port in said valve sleeve;

a first pressure responsive means in fluid communication with said control passage from said first valve means, said first pressure responsive means operably connected with said first valve means;

a mechanical connection between said first pressure responsive means and said first valve means to control valve movement in response to movement of said first pressure responsive means;

a second valve means including a valve housing open at one end to said fluid inlet port and at the other end to said fluid outlet port with a radial port intermediate said ends connected to a second control passage, a valve body mounted within said valve housing, said valve body having an axial passage communicating the fluid inlet pressure at one end of said housing to an annular groove in said valve body spaced from said one end thereof, another axial passage in said valve body communicating fluid outlet pressure from the other end of said housing to an annular groove in said valve body spaced from said other end thereof and from said annular groove receiving said fluid inlet pressure so that a valve land is formed between said annular grooves, which valve land is located to control the radial port of said valve housing, and spring means operatively connected to said valve body adjacent the end thereof receiving fluid inlet pressure to normally bias said valve body so that the land thereof is moved to communicate the groove receiving the fluid inlet pressure to the radial port;

a second pressure responsive means reciprocally mounted in said pump coextensively with said first pressure responsive means such that said second pressure responsive means is floatably mounted with respect to said first pressure responsive means; and means to additively connect said first and second pressure responsive means including a variable volume chamber between said first and second pressure responsive means that is communicated with said second control passage from said second valve means.

8. In a variable discharge pump according to claim 7 and further comprising:

an adjustable mechanism for said means biasing said valve spool; and a spring force varying means for said spring means.

References Cited by the Examiner

UNITED STATES PATENTS

| 2,648,312 | 8/53 | Tucker et al. | 103—38 X |
|---|---|---|---|
| 2,731,569 | 1/56 | Cardillo et al. | 103—38 X |
| 2,878,785 | 3/59 | Rexford | 91—433 X |
| 2,921,560 | 1/60 | Budzich | 91—433 |
| 3,009,422 | 11/61 | Davis et al. | 103—38 X |

LAURENCE V. EFNER, *Primary Examiner.*